United States Patent
Balakrishnan

(10) Patent No.: US 8,112,050 B2
(45) Date of Patent: Feb. 7, 2012

(54) REDUCING POWER CONSUMPTION IN RECEIVERS EMPLOYING CONVERSION TO INTERMEDIATE FREQUENCY

(75) Inventor: Jaiganesh Balakrishnan, Karnataka (IN)

(73) Assignee: Texas Instruments Incorporated, Dallas, TX (US)

( * ) Notice: Subject to any disclaimer, the term of this patent is extended or adjusted under 35 U.S.C. 154(b) by 814 days.

(21) Appl. No.: 12/047,345

(22) Filed: Mar. 13, 2008

(65) Prior Publication Data
US 2008/0227421 A1 Sep. 18, 2008

(30) Foreign Application Priority Data
Mar. 14, 2007 (IN) .............. 516/CHE/2007

(51) Int. Cl.
H04B 1/06 (2006.01)
H04B 7/00 (2006.01)
H04B 1/10 (2006.01)
H04B 15/00 (2006.01)
H04B 1/16 (2006.01)

(52) U.S. Cl. ............ 455/130; 455/233.1; 455/296; 455/313; 455/343.1; 455/574

(58) Field of Classification Search .......... 455/132–140, 455/313–326, 283–285, 295, 296, 303, 232.1, 455/233.1, 229, 343.1, 574; 375/326
See application file for complete search history.

(56) References Cited

U.S. PATENT DOCUMENTS

| | | | |
|---|---|---|---|
| 6,473,601 B1 * | 10/2002 | Oda ............................. | 455/132 |
| 7,302,013 B2 * | 11/2007 | Samueli et al. ............... | 375/316 |
| 7,702,298 B2 * | 4/2010 | Barratt et al. ................ | 455/101 |
| 2003/0174641 A1 * | 9/2003 | Rahman ........................ | 370/206 |
| 2007/0082648 A1 * | 4/2007 | Gallagher ................... | 455/343.2 |
| 2008/0014895 A1 * | 1/2008 | Li et al. ......................... | 455/324 |

* cited by examiner

*Primary Examiner* — Simon Nguyen
(74) *Attorney, Agent, or Firm* — Ronald O. Neerings; Wade James Brady, III; Frederick J. Telecky, Jr.

(57) ABSTRACT

A receiver to recover a signal of interest while consuming reduced power in some scenarios. The receiver contains a in-phase channel processing path and a quadrature phase channeling path for down converting an input signal to an intermediate frequency, and then recovering the signal of interest by further processing of the input signal at intermediate frequency. One of the two paths is turned off upon occurrence of a desired condition, which reduces power consumption. In an embodiment, the condition is that the input signal does not contain an image signal of the signal of interest.

20 Claims, 5 Drawing Sheets

US 8,112,050 B2

REDUCING POWER CONSUMPTION IN RECEIVERS EMPLOYING CONVERSION TO INTERMEDIATE FREQUENCY

RELATED APPLICATION

The present application claims priority from co-pending India provisional application serial number: 516/CHE2007, entitled: "Scenario Dependent Power Reduction Modes in Low-IF Receivers", filed on: 14 Mar. 2007, naming Texas Instruments Inc (the intended assignee) as Applicant and the same inventor (Jaiganesh Balakrishnan) as in the subject application as inventor, attorney docket number: TXN-917, and is incorporated in its entirety herewith.

BACKGROUND

1. Field of the Technical Disclosure

The present disclosure relates generally to communication receivers, and more specifically to power reduction techniques in a receiver that employs conversion to an intermediate frequency (IF).

2. Related Art

Receivers (communication receivers, for example in, wireless or wired systems) receive input signals from various sources, and process the received signal to recover a signal of interest containing information. In general, a signal of interest (e.g., encoding the information) is present in a frequency band of interest of the received input signals. The received signals (input signal) may also contain unwanted signals outside of the frequency band of interest.

Receivers often convert a received input signal to an intermediate frequency band (lower than the pass-band frequency of the input signal), with the IF frequency band being further down-converted at a later stage to the base-band signal ideally containing only the signal of interest. In some instances, one or more levels of down-conversion (to multiple corresponding intermediate frequencies) may be also be employed.

It is generally desirable that receivers be implemented to minimize power consumption.

BRIEF DESCRIPTION OF THE DRAWINGS

The present invention will be described with reference to the following accompanying drawings, which are described briefly below.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

1. Overview

A receiver provided according to an aspect of the present invention recovers a signal of interest while consuming reduced power in some scenarios. The receiver contains an in-phase channel processing path and a quadrature phase channel processing path for down converting an input signal to an intermediate frequency (IF), and then additional circuitry to recover the signal of interest by further processing of the input signal at intermediate frequency. One of the two paths is switched off upon occurrence of a desired condition, which reduces power consumption.

Various combinations of situations may be used as a basis for switching of the path. Examples of such situations include, whether the input signal does not contain an image signal of the signal of interest, whether the ratio of the strength of the signal of interest to the image signal is greater than a desired first threshold, whether the signal to noise of ratio of the signal of interest is above a desired second threshold.

According to another aspect of the present invention the switched off path is again switched on when the desired condition is absent. The absence of the desired condition may be confirmed by temporarily switching on both the paths and examining the output signals of the two paths.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well known structures or operations are not shown in detail to avoid obscuring the features of the invention.

2. Embodiment

Figure 1:
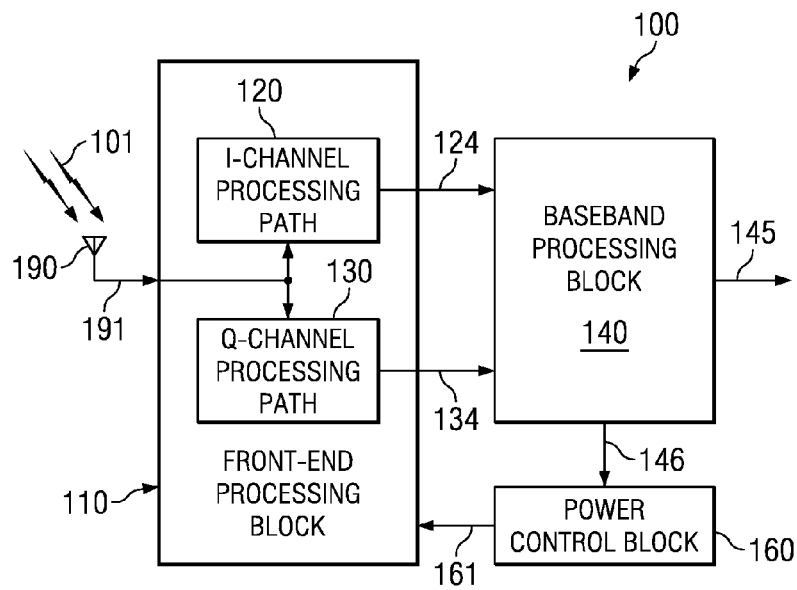
FIG. 1 is a block diagram of an example receiver in an embodiment of the present invention.

FIG. 1 is a block diagram of an example receiver in an embodiment of the present invention. Receiver 100 is shown containing antenna 190, front-end processing block 110, base-band processing block 140, and power control block 160. The details of receiver 100 are shown merely by way of illustration and typical receivers may contain more/fewer components than those depicted. Each block of receiver 100 is described below.

Antenna 190 receives input signals 101 in an input signal band of frequencies (input band), and provides input signal 101 to front-end processing block 110 via path 191. Antenna 190 may be implemented such that the input band (i.e. input signals 101) may contain both a signal(s) of interest in a desired band), as well as other undesired signals, as illustrated below with reference to FIGS. 2A and 2B.

Front-end processing block 110 receives input signal(s) 101 forwarded via path 191, and performs various front-end processing operations, such as down-conversion to intermediate frequency (IF), amplification, filtering of unwanted bands, etc. Front-end processing block 110 is shown containing I-channel processing path 120 and Q-channel processing path 130, but may contain additional components as well, for example, an amplifier which may be used to amplify the signal on path 191 prior to forwarding the signal to the I and Q processing paths.

I-channel processing path 120 (In-phase path) performs down-conversion of the input signal 101 (or 111) by mixing the signal with a local cosine signal of a desired frequency, while Q-channel processing path 130 (Quadrature phase path) performs down-conversion of the input signal 101 (or 111) by mixing the signal with a local sine signal of the same desired frequency, as is well known in the relevant arts. The corresponding down-converted (and processed, for example, by amplification) in-phase (I) and quadrature (Q) components are provided on paths 124 and 134 respectively.

Baseband processing block 140 may remove the undesired signal components from the down-converted I and Q components by operations such as further down-conversion and filtering, as described below examples. Thus, the desired signal may be formed at a baseband frequency. This desired signal may be demodulated to extract the information of interest, and provided on path 145. Alternative techniques may be employed in corresponding processing blocks to recover the information of interest from the down-converted I and Q components.

Power control block 160 may operate in conjunction with baseband processing block 140 to reduce power consumption according to several aspects of the present invention. The operation of the two blocks is described below with examples for illustration.

Figure 2A:
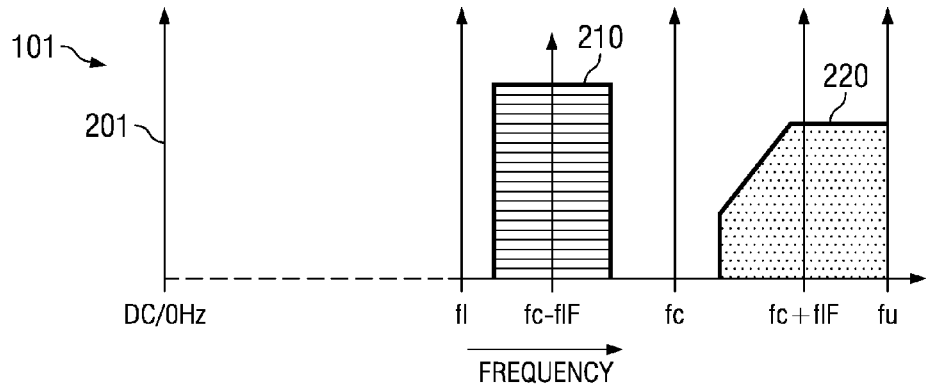
FIGS. 2A and 2B are diagrams illustrating a signal of interest and an image signal present in an input signal in an example scenario.
Figure 2B:
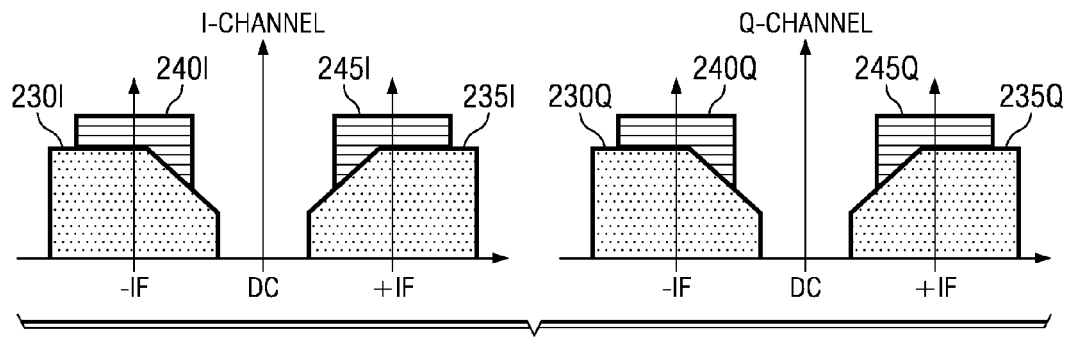

Before such description, a brief description of the terms input band, band of interest within the input band, and image band in an example scenario is provided next with respect to FIGS. 2A and 2B.

3. Image Band

FIG. 2A is a diagram illustrating the band of frequencies occupied by input signals 101, with DC or 0 Hz is represented by line 201 in an illustrative scenario. Input band is shown as containing the frequency range fl to fu.

Signals of interest 220 (band of interest) are shown having a centre frequency fc+fIF. As an illustration, signal 220 may correspond to an FM broadcast signal with a centre frequency of 100 MHz. Signal 220 may be down-converted by mixing with a local oscillator signal (for example, in front-end processing block 110) at frequency fc, to generate corresponding I and Q outputs at the desired (centered at) IF frequency fIF (after removing unwanted bands generated by the mixing process.

As is well known in the relevant arts, an image frequency is generally an undesired frequency that when mixed with a local oscillator produces the same intermediate frequency (IF) that the desired input frequency produces. Thus, assuming an undesired signal (image signal) 210 is present in an image band centered at fc−fIF, the mixing process noted above generates a down-converted image signal also centered at fIF.

FIG. 2B illustrates the double-sided magnitude spectrum of the frequencies present after down-conversion to IF. In FIG. 2B, 240I and 245I represent respectively the negative and positive frequencies of the I component of the image signal 210 (of FIG. 2A), 230I and 235I represent the negative and positive frequencies of the I component of the desired signal 220, 240Q and 245Q represent respectively the negative and positive frequencies of the Q component of the image signal 210, and 230Q and 235Q represent the negative and positive frequencies of the Q component of the desired signal 220. It may be observed from FIG. 2B that the image frequencies may overlap the desired signal as shown with respect to both I and Q components.

Baseband processing block 140 removes the undesired image frequencies, and provides signals specifying whether an image signal (corresponding to an image band noted above) is present or not (including its strength/level) on path 146. The manner in which power consumption is reduced in receivers employing conversion to IF is illustrated next with respect to a flowchart.

4. Reducing Power Consumption

Figure 3A:
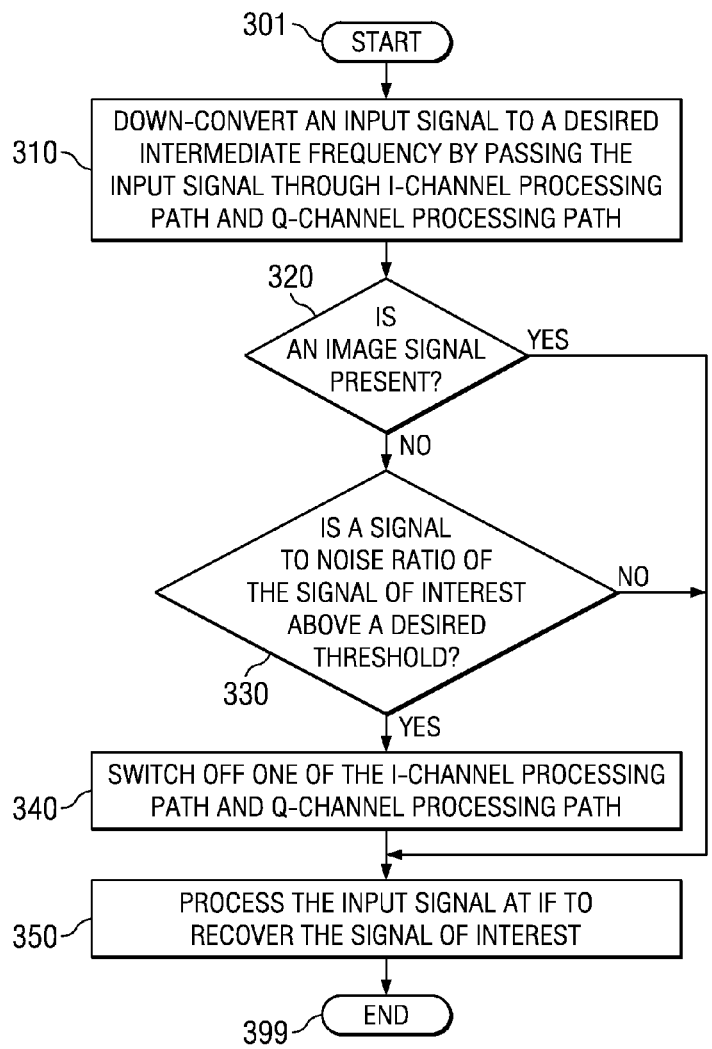
FIG. 3A is a flowchart illustrating the manner in which power consumption is reduced in a receiver in an embodiment of the present invention.

FIG. 3A is a flowchart illustrating the manner in which power consumption is reduced in a receiver in an embodiment of the present invention. The flowchart is described with respect to the components of FIG. 1 and FIG. 2 merely for illustration. However, various features described herein can be implemented in other environments, as will be apparent to one skilled in the relevant arts by reading the disclosure provided herein.

Furthermore, the steps are described in a specific sequence merely for illustration. Alternative embodiments in other environments, using other components, and different sequence of steps can also be implemented without departing from the scope and spirit of several aspects of the present invention, as will be apparent to one skilled in the relevant arts by reading the disclosure provided herein. It is assumed in the following description that both the I-channel processing path 120 and Q-channel processing path 130 are operational (switched on) initially. The flowchart starts in step 301 in which control is transferred to step 310.

In step 310, front-end processing block 110 down-converts input signal 101 to a desired intermediate frequency by passing the input signal through I-channel processing path 120 and Q-channel processing path 130. Assuming that both a desired signal and an image signal are present in the input signal, both the desired as well as image signal would be down-converted to IF. As is well known in the relevant arts, separate processing paths in front-end processing block 140, namely, the I-channel processing path 120 and Q-channel processing path 130, are used to enable removal of the image signal at a later stage (for example, in baseband processing block 140). Control then passes to step 320.

In step 320, base-band processing block 140 determines whether an image signal is present or not. The determination can be performed in a known way. If an image signal is deemed to be present, both the I and Q processing paths may need to be operational to enable removal of the image signal as noted above, and control passes to step 350. If an image signal is deemed to be absent, control passes to step 330.

It should be appreciated that the presence of image signal is only an example condition on which one of the two paths 120 or 130 is switched off, to reduce the power consumption. Alternative or additional conditions may also be required before such switching off is performed. Examples of such additional conditions include (but not limited to) whether the ratio of the strength of the signal of interest to the image signal is greater than a desired first threshold, whether the signal to noise of ratio of the signal of interest is above a desired second threshold (described below), etc.

Furthermore, though the description is provided with respect to conditions occurring and not occurring, it should be appreciated that the "condition not occurring" itself may be treated as a condition. In other words, the terms "condition occurring" and "condition not occurring" are used interchangeably in the description here.

In step 330, baseband processing block 140 determines if a signal-to-noise (SNR) ratio of the signal of interest is above a desired threshold. Baseband processing block 140 may provide such information to power control block 160. While baseband processing block 140 is noted as determining SNR, alternatively baseband may determine other metrics such as signal strength (as a condition to determine whether to switch off/on one of the paths). If the SNR is above the threshold, control passes to step 340, else control passes to step 350.

In step 340, power control block 160 switches off one or more components of one of the I-channel processing path and Q-channel processing path. In general, it is desirable that at least the components (if not all components of the path) that would consume more power be switched off. However, the specific components to be switched off can be determined based on the specific environment in which the features are implemented. Control then passes to step 350.

In step 350, baseband processing block 140 processes the input signal (down-converted to IF) to recover the signal of interest and demodulate the information contained in it. Such processing may be performed in a known way. Control then passes to step 399, in which the flowchart ends.

Thus, if receiver 100 determines that an image signal is absent, and if other conditions such as SNR of the desired signal are acceptable, (components in) one of I and Q processing paths are switched off, thereby reducing power consumption. Although, step 330 is noted above as being performed, it must be understood that this step may be optional, and power control block 160 may base the decision to switch off one of the paths on step 320 alone.

It may be appreciated that since both I and Q processing paths may be required to enable removal of the image signal, power control block may maintain the switched-off path in the 'off' condition only for a predetermined duration. At the end of the predetermined duration, power control block 160 may switch on the previously switched off path to enable determination of whether the image signal continues to be absent, and the corresponding steps noted above may be repeated.

Figure 3B:
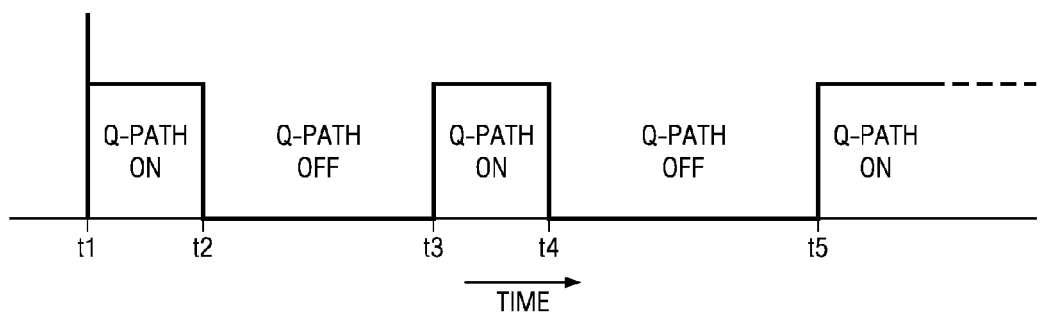
FIG. 3B is a timing diagram illustrating on and off durations of a Q channel processing path in an embodiment of the present invention.

An illustration of the on/off durations of the corresponding path is provided next with respect to FIG. 3B. In FIG. 3B, it is assumed that I-channel processing path 120 is always on, and receiver 100 operates to minimize power consumption by switching off Q-channel processing path 130, as described above. However, I-channel processing block may instead be switched off and Q-channel path on. Receiver 100 is assumed to be switched on (begins operation) at time instance t1. The input signal is shown as a function of time, with various input signal portions (with respect to time) shown in time durations t1-t2, t2-t3, t3-t4, etc.

As noted above, on power-on of receiver 100, both I channel processing path 120 and Q channel processing path 130 are in a powered-ON state. In the interval t1-t2 (which may be considered as containing a first portion of the input signal), baseband processing block 140 may determine that no image signal is present. Consequently, power control block 140 switches off Q channel processing path 130 at time instance t2. Q channel processing path 130 may be maintained in the off state till time instance t3, when it is powered on again by power control block 160.

Assuming, baseband processing block 140 determines again (within interval t3-t4, such an interval containing another portion of the input signal) that no image signal is present, power control block 140 switches off Q channel processing path 130 at time instance t4. The operations notes above are repeated. If during a next interval starting at time instance t5, baseband processing block 140 determines that an image signal is present. Power control block 140 maintains Q channel processing path 130 in a powered-ON state, as shown in the Figure. Q channel processing path 130 may be powered off at a later time instance only upon determination that an image signal is absent.

It must be understood that, step 310 noted above is operational even during periods when Q channel processing path 130 is powered OFF, to enable baseband processing block 140 to demodulate the signal of interest continuously.

In an embodiment, receiver 100 is a frequency modulation (FM) receiver, with a decision interval (such as t3-t4) having a duration of (approximately) 100 milliseconds (ms), and the duration for which Q channel processing path 130 is switched off (such as interval t4-t5) being 10 seconds.

In general, the length of time (of intervals, such as t4-t5) for which the corresponding path (Q channel processing path 130 in the example above) is to be powered off may be determined based in the operational context. For example, assuming receiver 100 is a mobile (roving) FM receiver, such interval may be determined based on the typical probability of receiver 100 moving into a broadcast area receiving an FM broadcast in the image band of receiver 100.

It should be appreciated that the features described above can be realized in various embodiments. The description is continued with respect to an example embodiment implementing the features described above.

5. Receiver

Figure 4:
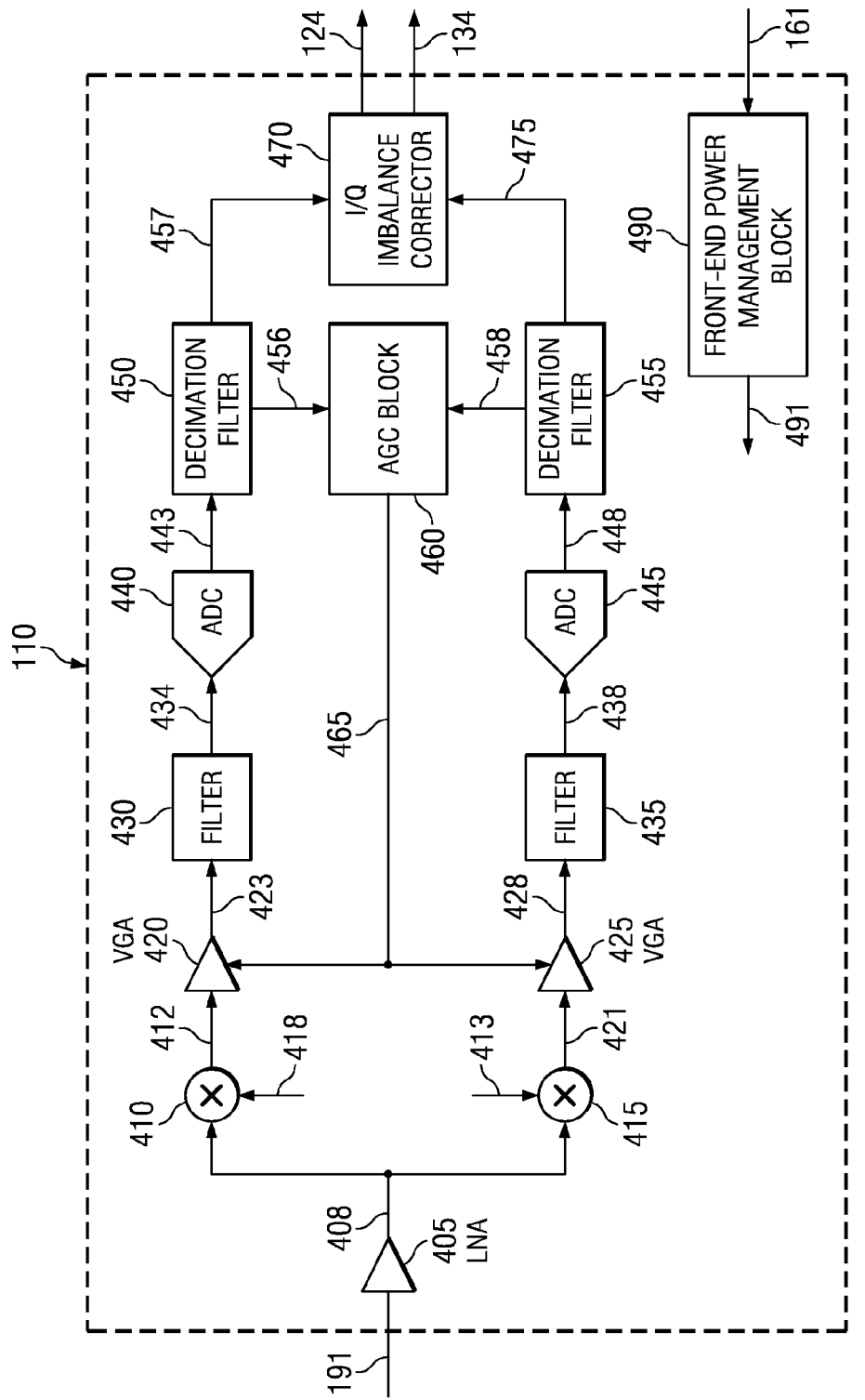
FIG. 4 is a block diagram of a front-end processing block in an embodiment of the present invention.

FIG. 4 is a block diagram of a front-end processing block of a receiver in an embodiment of the present invention. Front-end processing block 110 is shown containing low-noise amplifier (LNA) 405, I-mixer 410, Q-mixer 415, variable gain amplifiers (VGA) 420 and 425, filters 430 and 435, analog to digital converter (ADC) 440 and 445, decimation filters 450 and 455, AGC block 460, I/Q imbalance corrector 470, and front-end power management block 490.

In the embodiment of FIG. 4, mixer 410, VGA 420, filter 430, ADC 440 and decimation filter 450 constitute I channel processing path 120, while mixer 415, VGA 425, filter 435, ADC 445 and decimation filter 455 constitute Q channel processing path 130. The blocks of FIG. 4 are described in detail below. As will be apparent to one skilled in the relevant arts, separate I and Q paths are provided to enable removal of an image frequency. The I and Q paths together may be viewed as performing a complex (in a mathematical sense) down-conversion on input signal 101/191.

LNA 405 receives an input signal on path 191, and provides amplification with minimum noise addition. The amplified signal is provided on path 408 to mixers 410 and 415. It should be appreciated that LNA 405 can be provided within antenna 190 as well, and generally needs to amplify the received signal.

Mixer 410 (I-mixer) mixes (multiplies) signal 408 by a local oscillator of a desired frequency and phase (assumed to be 0 degrees and hence termed a cosine local oscillator) to generate a corresponding signal at the desired IF. Similarly, mixer 415 (Q-mixer) mixes (multiplies) signal 408 by a local oscillator of the same desired frequency and 90 degrees phase (hence termed a sine local oscillator) also to generate a corresponding signal at the desired IF.

The combined operation of the mixing in the I-mixer and Q-mixer by corresponding cosine and sine local oscillator frequencies may be viewed as complex multiplication. The outputs of the mixer 410 and 415 are provided on paths 412 and 421 respectively, and may contain the sum as well as the difference frequencies of the inputs signal and the local oscillator signal, as is well known in the relevant arts.

As an illustration, assuming that the received signal 101 consists of an FM modulated signal and an FM modulated image with equal powers, the input to the I and Q mixers (410 and 415 respectively) can be represented as $$\underbrace{\cos\left\{2\pi(f_c + f_{IF})t + \int s(t)dt\right\}}_{signal} + \underbrace{\cos\left\{2\pi(f_c - f_{IF})t + \int i(t)dt\right\}}_{image} \quad \text{Equation 1}$$

wherein s(t) is the message transmitted in the signal band and i(t) is the message transmitted in the image band. The mixing operation may be considered as a complex multiplication with $\exp(j2\pi f_c t)$.

VGA 420 amplifies the signal on path 412, and forwards a corresponding amplified signal on path 423. Similarly, VGA 425 amplifies the signal on path 418, and forwards a corresponding amplified signal on path 428.

Filter 430 (implemented as a low-pass filter) receives the signal on path 423, and forwards only the difference frequencies generated by mixer 410. Filter 435 (also implemented as a low-pass filter) receives the signal on path 428, and forwards only the difference frequencies generated by mixer 415.

Denoting the frequency of (both) local oscillators provided on paths 418 and 413 as fc, the frequency of the signal of interest as fc+fIF, and the frequency of the image signal as fc−fIF (as also illustrated with respect to FIGS. 2A and 2B), path 434 may be viewed as containing the cosine component of the signal of interest at −fIF, as well as the cosine component of the image signal at +fIF. Similarly, path 438 may be viewed as containing the sine component of the signal of interest at −fIF, as well as the sine component of the image signal at +fIF. Paths 434 and 438 considered together thus contain the down-converted input signal (containing desired signal plus image signal plus noise) at the intermediate frequency (IF), with the desired signal being at complex frequency −fIF, and the image frequency (if present) at complex frequency +fIF.

The equivalent complex base-band output signal of the filters can be mathematically represented as given by equation 2 below.

$$\underbrace{\exp\left\{-j2\pi f_{IF}t + \int s(t)dt\right\}}_{signal} + \underbrace{\exp\left\{j2\pi f_{IF}t + \int i(t)dt\right\}}_{image} \quad \text{Equation 2}$$

Wherein 'exp { }' denotes (e to the power of operation).

ADC 440 receives the analog signal (described above) on path 434, and generates digital samples of the signal at corresponding time instances. ADC 440 forwards the digital samples on path 443. Decimation filter 450 may perform decimation operation, forwarding on path 457 only every 'nth' sample from the sequence of digital samples received on path 443. Decimation filter 450 also provides the down-sampled signal on path 456 to AGC and DC offset estimation block 460.

ADC 445 receives the analog signal (described above) on path 438, and generates digital samples of the signal at corresponding time instances. ADC 445 forwards the digital samples on path 448. Decimation filter 455 may perform a filtering and decimation operation, forwarding on path 475 only every 'nth' sample from the filtered sequence of digital samples received on path 448. In general, decimation filters 450 and 455 are used to filter the corresponding out-of band image signals (blockers), if any, and down-sample the output of the corresponding ADC to the appropriate sampling rate. In certain scenarios, for example when a Sigma-Delta ADC is employed (i.e., ADCs 440 and 445 are implemented as sigma-delta ADCs) the decimation filters may be additionally used to remove the out-of-band noise.

AGC block 460 operates to provide automatic gain control (AGC) of corresponding I and Q paths by adjusting the gain of VGA 420 and 425

I/Q imbalance corrector 470 receives the outputs of the I channel processing path 120 and Q channel processing path 130 via paths 457 and 475 respectively, and operates to correct the difference/imbalance (e.g., imbalance in amplitude/phase) between the corresponding outputs. I/Q imbalance corrector 470 forwards the imbalance-corrected signals on paths 124 and 134 respectively.

Front-end power management block 490 receives an indication via path 161 whether Q channel processing path 130 components are to be turned off or on, and operates via path 491 to power on/off the corresponding components in Q channel processing path 130. Path 491 may be a single path to control power to the whole of Q channel processing path 130, or may contain multiple paths to separately control the constituent components of Q channel processing path 130, depending on the specific manner in which the various components are implemented. The paths may switch off at least the higher power consuming components (e.g., ADC 445, VGA 425 and decimation filter 455, and filter 435 at least to the extent the filter 435 is implemented using active components).

While the embodiment is described as controlling power by switching on/off the Q channel processing path 130, it must be understood that such a feature can be implemented instead on I channel processing path 120.

The description is continued with respect to baseband processing block 140 and power control block 160.

6. Baseband Processing and Power Control

Figure 5:
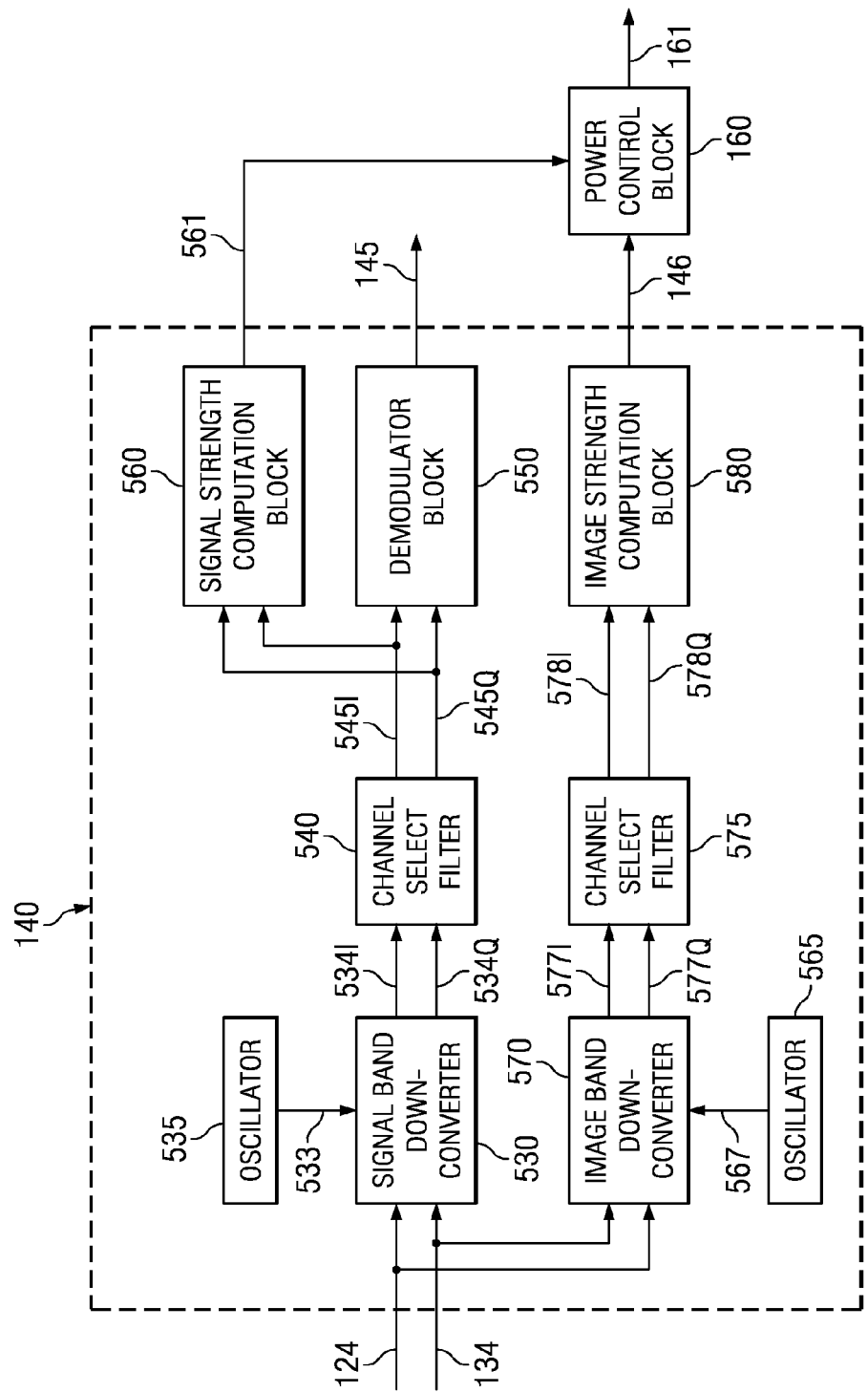
FIG. 5 is a block diagram illustrating the details of a base-band processing block in an embodiment of the present invention.

FIG. 5 is a block diagram illustrating the details of baseband processing block 140. Power control block 160 is also shown in the Figure. Baseband processing block 140 is shown containing signal band down-converter 530, image band down-converter 570, oscillators 535 and 565, channel select filters 540 and 575, demodulator block 550, signal strength computation block 560, and image strength computation block 580. The components/blocks of FIG. 5 are described in detail below.

Signal band down-converter 530 receives digital samples on path 124 and 134 and down-converts the signal of interest to DC, by multiplying the samples with a (digital) local oscillator signal (path 533) at complex frequency +fIF. The output of signal band down-converter 530 is provided on respective paths 534I and 534Q, with each path contain sum and difference frequencies generated by the multiplication noted above.

The output of signal band down-converter 530 can be mathematically represented as given by equation 3 below:

$$\underbrace{\exp\left\{\int s(t)dt\right\}}_{signal} + \underbrace{\exp\left\{j4\pi f_{IF}t + \int i(t)dt\right\}}_{image} \quad \text{Equation 3}$$

Channel select filter 540 (implemented as a low-pass filter) receives the respective sum and difference frequencies on corresponding paths 534I and 534Q and forwards only the difference frequencies on corresponding paths 545I and 545Q. Assuming oscillator 535 provides a complex frequency of +fIF, the output on path 545I/545Q contains the desired signal at DC (zero frequency).

Assuming an image signal (frequency +fIF, as noted above) is present on path 124/134, the multiplication by complex frequency +fIF (received from oscillator 535) in signal band down-conversion block 530 generates frequencies of value 2fIF which are filtered/rejected by channel select filter 540. Thus, it may be appreciated that signal band down-converter 530 in combination with channel select filter 540 operate to remove any image signal present on paths 124/134, and provide only the signal of interest (at DC) to demodulator 550.

Demodulator block 550 may demodulate the desired signal at DC on paths 545I/545Q to extract the information contained in the signal of interest. Demodulator block 550 forwards the information (e.g., data) on path 145. Signal strength computation block 560 operates to measure the signal strength of the desired signal received on paths 545I/545Q, and provides an output on path 561 indicating the signal strength. Alternatively, or in addition, signal strength computation block 560 can also determine (estimate) the signal to noise ratio (SNR) based on a priori knowledge of the analog front-end Noise Figure (NF).

Image band down-converter 570 receives digital samples on path 124 and 134 and down-converts the image signal (if present) to DC, by multiplying the samples with a (digital) local oscillator signal (path 567) at complex frequency −fIF, thereby down-converting the image signal to DC. The output of image band down-converter 530 is provided on respective paths 577I and 577Q, with each path containing sum and difference frequencies generated by the multiplication noted above.

The output of image band down-converter 570 can be mathematically represented as $$\underbrace{\exp\{-j4\pi f_{IF}t + \int s(t)dt\}}_{signal} + \underbrace{\exp\{\int i(t)dt\}}_{image} \quad \text{Equation 4}$$

Channel select filter 540 (implemented as a low-pass filter) receives the respective sum and difference frequencies on corresponding paths 577I and 577Q and forwards only the difference frequencies on corresponding paths 578I and 578Q. Assuming oscillator 565 provides a complex frequency of −fIF, the output on path 578I/578Q contains the image signal at DC (zero frequency).

Image strength computation block 580 computes the strength (e.g., amplitude, power, etc) of the image signal received on paths 578I/578Q, and provides a corresponding indication of the strength of the image signal on path 146.

Power control block 160 receives the image strength indication on path 146, and signal strength indication on path 561 (path 561 is not shown separately in FIG. 1). If signal 146 indicates that the image signal is absent (corresponding to, for example, an image signal strength being below a threshold), power control block 160 provides a corresponding signal on path 161 to cause front-end power management block 490 to power off the components in Q channel processing path 130.

In alternative embodiments, when signal 146 indicates absence of an image signal, power control block 160 may in addition check the signal strength indicated via path 561. In such an embodiment, power control block 160 may provide 'power-off' indication on path 161 only if signal 561 (simultaneously) indicates that the strength of the desired signal is equal to or greater than a desired value (i.e., the additional condition that the SNR being less than the desired value is absent).

In another embodiment, power control block 160 may provide the 'power-off' indication if the ratio of the strengths of the signal of interest to image signal strength is above a desired level (i.e., the condition that the ratio of the strengths of the signal of interest to image signal strength being less than the desired level is absent). As described with respect to FIG. 3B, power control block 160 may monitor signal 146 at periodic intervals.

It may be appreciated that during typical operating conditions of receiver 100, the strength of an image signal may vary. It is desirable that the Q channel processing path 130 should not abruptly be powered on/off (transition in-or-out of power save mode), since such abrupt on/off operation may cause corresponding abrupt changes in the SNR of the desired signal which may be perceptible to a listener (assuming audio reception).

Therefore, it is desirable that the output of the Q channel processing path 130 be gradually added or removed from path 475. The manner in which such smooth transitions between power on/off is performed is described next with respect to FIG. 6.

Figure 6:
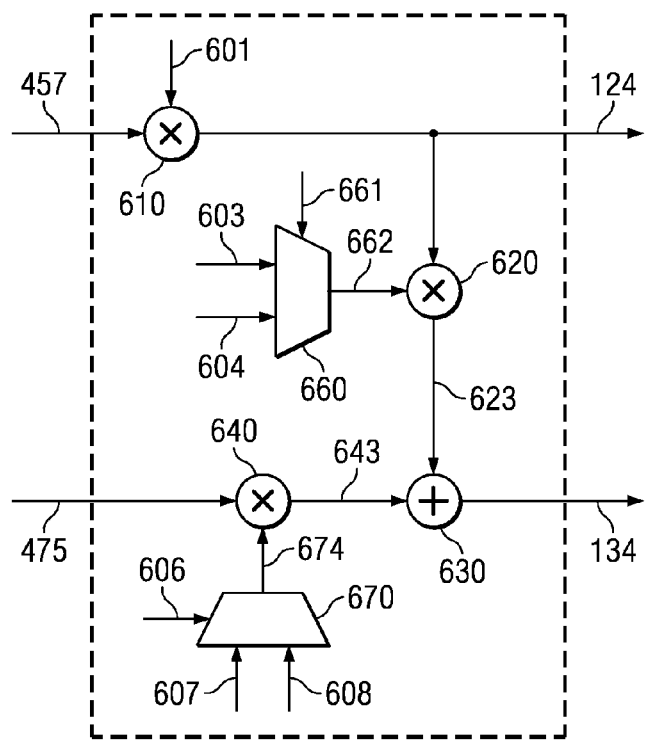
FIG. 6 is a block diagram of an I/Q imbalance corrector in an embodiment of the present invention.

FIG. 6 illustrates I/Q imbalance corrector 470 in an embodiment of the present invention. I/Q imbalance corrector 470 is shown containing multipliers 610, 620 and 640, adder 630, and multiplexers 660 and 670. The operation of I/Q imbalance corrector 470 is described below.

When both the I and Q channels are active (i.e., I channel processing path 120 and Q channel processing path 130 are both enabled), I/Q imbalance corrector block 470 compensates for the gain and phase imbalance between the in-phase and quadrature paths. The gain imbalance is corrected by multiplying the in-phase signal (457) with a scaling factor $\alpha^{-1}$ (601), where α is the gain imbalance between the I and Q paths.

The phase imbalance is corrected by adding a scaled version of the in-phase signal (457) with a scaled version of the quadrature-phase signal (475). A scaling factor tan(φ) is provided on path 662 and is used to scale the in-phase signal prior to adding to the quadrature-phase signal (475) which is scaled by a different scaling factor sec(φ) provided on path 674.

According to an aspect of the present invention, if power control block 160 determines that Q channel processing path 130 is to be switched off, the output of Q channel processing path 130 provided on path 475, and forwarded by I/Q imbalance corrector 170 on path 134 is gradually reduced to zero, before switching off Q channel processing path 130.

Figure 7A:
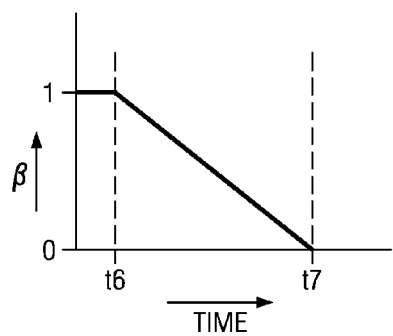
FIGS. 7A and 7B are timing diagrams illustrating the manner in which the output of a Q channel processing path is gradually reduced.
Figure 7B:
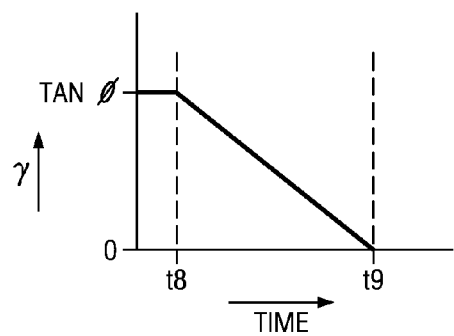

In an embodiment, a gain smoothing multiplier (denoted β) is provided (internally computed and used) on path 608. During normal operation (with Q channel processing path 130 powered on), control signal 606 provides the sec(φ) input 607 on path 674. When it is desired to switch off Q channel processing path 130, control signal 606 selects the gain smoothing multiplier β to be provided on path 674. As depicted in FIG. 7A, the value of β is initially selected to be 1 (time instance t6), and is gradually (linearly in the example shown) reduced to zero (time instance t7). At time instance t7, power control block 160 switches off power to Q channel processing path 130.

A gain smoothing multiplier (denoted γ) is provided on path 604 to be able to obtain smooth transition on correction caused by tan(φ). During normal operation (with Q channel processing path 130 powered on), control signal 661 provides the tan(φ) input 603 on path 662. When it is desired to switch off Q channel processing path 130, if in addition it is desired to provide smoothing for the effect of tan(φ) also, control signal 661 selects the gain smoothing multiplier γ to be provided on path 662. The value of γ is initially selected to be tan(φ) (time instance t8), and is gradually (linearly in the example shown) reduced in magnitude to zero (time instance t9). At time instance t9, power control block 160 switches off power to Q channel processing path 130.

When it is determined that Q channel processing path 130 needs to be switched on, the constituent components in Q channel processing path 130 are first powered on, following which the output of Q channel processing path 130 provided on path 475 and forwarded by I/Q imbalance corrector 170 on path 134 is gradually increased to its normal level.

Thus, control signal 606 may select the gain smoothing multiplier β to be provided on path 674, with the value of β being initially set to zero. The value of β is then gradually (e.g., linearly) increased to a value of one. By thus gradually blending the output of the Q channel processing path 130 in or out of the data path (134), abrupt changes in the SNR of the desired signal are avoided. Once the blending is completed, the control signals 606 and 661 are set so as to select sec(φ) to be provided on path 674 and tan(φ) to be provided on path 662.

In another embodiment, during the transition the control signal 661 may select the gain smoothing multiplier γ to be provided on path 662, with the value of γ being initially set to zero. The value of γ is then gradually (e.g., linearly) increased in magnitude to a value of tan(φ).

Thus, several features of the present invention enable reduction of power in a receiver. Receivers thus implemented can be employed in various systems/devices (collectively referred to as devices). In general, the device would contain various components as suited for the specific environment. The devices may contain a processor (such a central processing unit) to process the digital values representing the signal of interest in a received analog input signal (processed by the receiver described above).

7. Conclusion

While various embodiments of the present invention have been described above, it should be understood that they have been presented by way of example only, and not limitation. Thus, the breadth and scope of the present invention should not be limited by any of the above-described embodiments, but should be defined only in accordance with the following claims and their equivalents.

What is claimed is:

1. A method of recovering a signal of interest from an input signal, said method comprising:
   receiving a first portion of said input signal in a first frequency band, said signal of interest being contained in a second frequency band contained in said first frequency band;
   down converting said first portion of said input signal to a third frequency band to generate a down converted signal using an in-phase channel processing path and a quadrature phase channel processing path, wherein said third frequency band is lower than said first frequency band;
   recovering said signal of interest in said first portion based on said down converted signal;
   determining whether a condition has occurred by examining said first portion;
   switching off one or more components of a first path if said condition is absent, wherein said first path comprises one of said in-phase channel processing path and said quadrature phase channel processing path; and
   performing said down converting and said recovering for a subsequent portion of said input signal with said first path switched off.

2. The method of claim 1, further comprising:
   checking again after said switching off, whether said condition has occurred for a later portion of said input signal following said first portion; and
   maintaining the first path in an on state if said condition has occurred and in an off state otherwise.

3. The method of claim 2, wherein said condition is presence of an image signal of said signal of interest.

4. The method of claim 3, wherein said condition further comprises one or more of whether a signal to noise ratio (SNR) of said recovered signal of interest is above a first desired threshold and whether the strength of said recovered signal is above a second desired threshold.

5. The method of claim 2, wherein said condition is that the ratio of the strength of said signal of interest to said image signal is below a desired threshold level.

6. The method of claim 5, further comprising:
   gradually increasing the output provided by said first path after performing said switching on.

7. The method of claim 2, further comprising:
   switching on said first path to enable said checking again.

8. The method of claim 7, wherein said checking is performed periodically when said one of one of said in-phase channel processing path and said quadrature phase channel processing path is switched off.

9. The method of claim 2, further comprising:
   gradually reducing the output provided by said first path before performing said switching off.

10. A receiver for recovering a signal of interest from an input signal, said receiver comprising:
    a pair of paths including an in-phase (I) channel processing path and a quadrature phase (Q) channel processing path, both to receive a first portion of said input signal in a first frequency band, said signal of interest being contained in a second frequency band contained in said first frequency band, each of said pair of paths to down convert said first portion of said input signal to a third frequency band to respectively generate an I-component and a Q-component of a down converted signal, wherein said third frequency band is lower than said first frequency band;
    a processing block to recover said signal of interest in said first portion based on said down converted signal; and
    a power control block to determine whether a condition has occurred by examining said first portion and to switch off one or more components of a first path if said condition is absent, wherein said first path is one of said pair of paths and a second path is the other one of said pair of paths,
    wherein said second path provides a corresponding down converted component for a subsequent portion of said input signal with said first path switched off and said processing block recovers the corresponding information of interest in said subsequent portion based on said corresponding down converted portion of said input signal.

11. The receiver of claim 10, wherein said power control block is designed to check again after said switching off, whether said condition has occurred for a later portion of said input signal following said first portion, and to maintain said first path in an on state if said condition has occurred and in an off state otherwise.

12. The receiver of claim 11, wherein said condition is that the ratio of the strength of said signal of interest to said image signal is below a desired threshold level.

13. The receiver of claim 11, wherein said power control block is designed to switch on said first path to enable said checking again.

14. The receiver of claim 13, wherein said power control block is designed to check periodically whether said condition occurs or not.

15. The receiver of claim 11, wherein said pair of paths are contained in a front end processing block, said front end processing block further comprising:
    a power management block to receive an indication whether said condition is present or absent and to switch on or off said first path based on said indication; and
    an imbalance corrector block to gradually reduce the output provided by said first path before performing said switching off and to gradually increase the output provided by said first path after performing said switching on.

16. The receiver of claim 15, wherein said imbalance corrector block comprises:
    a first multiplier to multiply said I-component with a gain scaling factor to form a gain corrected I-component, wherein said gain corrected I-component is provided as said I-component of said down converted signal;
    a first multiplexor to select one of a first phase scaling factor and a first gain smoothing factor as a first selected output, wherein said first multiplexer is designed to select said first phase scaling factor when said condition is determined to have occurred and to select said first gain smoothing factor otherwise;
    a second multiplier to multiply said Q-component with said first selected output to form a scaled Q component;
    a second multiplexor to select one of a second phase scaling factor and a second gain smoothing factor as a second selected output, wherein said second multiplexer is designed to select said second phase scaling factor when said condition is determined to have occurred and to select said second gain smoothing factor otherwise, wherein said second gain smoothing factor is selected on the corresponding output if additional smoothing than that caused by said first phase scaling factor is to be obtained;
    a third multiplier to multiply said gain corrected I-component with said second selected output to form a scaled I-component; and
    an adder to add said scaled I-component and said scaled Q-component to form said Q-component of said down-converted signal.

17. The receiver of claim 10, wherein said condition is presence of an image signal of said signal of interest.

18. The receiver of claim 17, wherein said condition further comprises one or more of whether a signal to noise ratio (SNR) of said recovered signal of interest is above a first desired threshold and whether the strength of said recovered signal is above a second desired threshold.

19. A device comprising:
    a processor to process a plurality of digital values; and
    a receiver to generate said plurality of digital values from an input signal, said receiver comprising:
    means for receiving a first portion of said input signal in a first frequency band, said signal of interest being contained in a second frequency band contained in said first frequency band;
    means for down converting said first portion of said input signal to a third frequency band to generate a down converted signal using an in-phase channel processing path and a quadrature phase channel processing path, wherein said third frequency band is lower than said first frequency band;
    means for recovering said signal of interest in said first portion based on said down converted signal;
    means for determining whether a condition has occurred by examining said first portion;
    means for switching off one or more components of a first path if said condition is absent, wherein said first path comprises one of said in-phase channel processing path and said quadrature phase channel processing path; and
    means for performing said down converting and said recovering for a subsequent portion of said input signal with said first path switched off.

20. The device of claim 19, wherein said receiver is a frequency modulated (FM) receiver and wherein said one or more components comprise an analog to digital converter (ADC) contained in said first path.

* * * * *